United States Patent [19]

Carney

[11] Patent Number: 5,781,654
[45] Date of Patent: Jul. 14, 1998

[54] CHECK AUTHENTICATION SYSTEM UTILIZING PAYEE INFORMATION

[75] Inventor: James F. Carney, Staten Island, N.Y.

[73] Assignee: Merrill Lynch & Co., Inc., New York, N.Y.

[21] Appl. No.: 588,105

[22] Filed: Jan. 18, 1996

[51] Int. Cl.$^6$ ...................................................... G06K 9/00
[52] U.S. Cl. ........................ 382/137; 705/45; 340/825.34
[58] Field of Search ................................ 382/112, 137, 382/138, 139, 140; 380/28; 395/244, 245; 356/71; 340/825.33, 825.34; 705/44, 45

[56] References Cited

U.S. PATENT DOCUMENTS

| | | | |
|---|---|---|---|
| 3,985,998 | 10/1976 | Crafton | 235/61.7 B |
| 3,990,558 | 11/1976 | Ehrat | 194/4 R |
| 4,568,936 | 2/1986 | Goldman | 340/825.34 |
| 5,146,512 | 9/1992 | Weideman et al. | 382/30 |
| 5,341,428 | 8/1994 | Schatz | 380/23 |
| 5,432,506 | 7/1995 | Chapman | 340/825.34 |
| 5,509,692 | 4/1996 | Oz | 383/70 |
| 5,550,932 | 8/1996 | Blaylock et al. | 382/139 |

OTHER PUBLICATIONS

1992 ANSI Meeting Minutes document entitled "Meeting Minutes Fraud Prevention Document," Helene Kotonis–Chair, Sep. 30, 1992.

Gundlach et al., "AT&T Easylink Services Provides Telex Connection for AS/400," Business Wire (San Francisco, CA) s1 p1, Jan. 28, 1991.

"How Banks Tackle the Tricks of the Trade," Euromoney, p90(2), Nov. 1986.

Taylor, "Check Fraud: Preventive Measures for Businesses," Journal of Check Management, v12 n1, pp. 34–38, Jan./Feb. 1992.

*Primary Examiner*—Andrew W. Johns
*Attorney, Agent, or Firm*—Hopgood, Calimafde, Kalil & Judlowe LLP

[57] ABSTRACT

A system and method for detecting and thus preventing check fraud utilizing a digital computer with image capture and interpretation systems. The system converts the payee information, issue date and the MICR line information (account number, check number and dollar amount) to a check digit which is then placed into the MICR line of a check, printed on its face or transmitted via the paid issuance file to the drawee bank. The drawee bank, upon presentment utilizes a transformation algorithm to convert the printed payee information and issue date on the check into a numerical value that is combined with MICR line information and a check digit is calculated based upon pre-agreed logic. This unique data processing system quickly confirms properly presented checks while effectively precludes payee and other alterations in a cost effective manner.

20 Claims, 4 Drawing Sheets

CHECK AUTHENTICATION SYSTEM UTILIZING PAYEE INFORMATION

FIELD OF THE INVENTION

The present invention generally relates to a computer system and data processing techniques for detecting fraud and abuse in commercial instruments. More particularly, the present invention relates to a data processing system that works in concert with specifically delineated software to ensure checks issued and presented through the banking system contain no material alterations to printed check information, such as the payee name, issue date, check number and check amount.

BACKGROUND OF THE INVENTION

For many centuries, money has been used to permit market transactions of goods and services. Money was often in the form of coinage and other types of currency and thus immediately liquid—and subject to immediate loss. To expand the available transactions, banks became available to extend credit for goods and services in the market. Such credit extensions were leveraged on deposits and took the form of various types of commercial paper including promissory notes, letters of credit, drafts and, more commonly, checks on account. These financial instruments have provided substantial capital and increased asset liquidity and thus supported greater—debt based—economic growth.

However, transactions based on paper have long suffered significant losses as a result of acts of fraud. Specifically, paper was easily stolen and modified in ways that misled the drawee bank into inappropriately releasing check defined currency. For the most part, this involved altering the check in a way undetectable to the bank. When presented for payment, the modified check would be honored with the resulting financial loss to be allocated between the drawee bank (bank of first deposit) and check writer of the funds usurped by the altered or fraudulently created check.

To combat this fraud, banks have employed many techniques for confirming check validity. For example, checks will routinely include information about the drawing account and amount to be drawn. Special patterns and designations are applied to the blank paper check stock to discourage replication. In fact, centuries ago, checks required a personal "chop" to permit cashing.

Notwithstanding these techniques, modern practices of check writing and encashment remains mired in scams and fraud, resulting in billions of dollars of lost funds and is growing at an alarming rate due to the use of technology such as image scanners, personal computers and laser printers. Moreover, banks and other institutions are responsible for cashing many pre-printed checks of the type now typically used for payroll, dividends, etc. These checks are computer generated by the check issuer with specialized accounting software to track the transactions on an aggregate basis and to record individual account activity. In some ways, these automated issuance systems make it easier for check forgers to alter or reproduce fraudulent checks. Banks also, in an effort to reduce the costs of processing presented checks and posting them to customer accounts, have implemented sophisticated equipment and software to greatly automate these processes. One of the unfortunate results of this automation, however, is that fewer customer checks are physically handled and reviewed by bank personnel, making it more likely that these reproductions of originally issued checks with altered payees will go undetected. Even when physically inspected, however, many of these falsified items so clearly match the appearance of an original check drawn on the same customer account that the counterfeit is still not detected. These types of fraudulent items are resulting in losses of approximately five billion dollars per year and are growing at an alarming rate.

As an example of this widespread type of check fraud, in 1993, two checks for $80,000.00 were stolen from the Philadelphia Post Office. These checks included a printed name identifying the payee on the check. In addition, these checks included information of the check number, account number and dollar amount. The fraud was perpetrated by creating a duplicate check in the same font/typeface on security paper with MICR (Magnetic Ink Character Recognition) encoding used by banks to read the key pieces of information about a check in an automated fashion. This was done so the copy was identical to the check stock that was initially issued. The sole difference from the original item was that the payee had been changed. An account had been opened in the fictitious payee's name and the duplicate check was deposited into the account. The duplicated check was presented for payment and the funds were transferred to the falsified account, which was then closed out after the deposit funds were withdrawn. Since the check number, account number and the amount were all accurate, and the check appeared to be the original, the check was honored and the fraud uncovered only after the funds had been removed from the fictitious payee's account.

The foregoing example is not a lone event. Similar schemes are being perpetrated by check fraud rings worldwide at an astounding rate. Computer generated paychecks for stock dividends, payrolls and similar automated check preparation systems are now used extensively throughout the U.S. to issue millions of checks each day. Each check must include the printed payee as discussed above, and thus each is subject to the same kind of potential fraud. To prevent this and other types of fraud, the present invention has been created.

OBJECTS AND SUMMARY OF THE PRESENT INVENTION

It is an object of the present invention to provide a data processing system for managing check preparation and processing to prevent check alteration.

It is another object of the present invention to provide a data processor for confirming validity of checks presented for payment in a manner that precludes payee substitution.

The above and other objects of the present invention are realized in a unique data processing system that reads, interprets, and converts alpha characters found in payee names to a numeric value. The numeric information from the payee is combined with selected information from the MICR line and other parts of the check (check number, account number, issue date and dollar amount), and the combined information is used in a check digit routine. The result of the check digit routine is conveyed to the drawee bank. The drawee bank will use this information to validate the check upon presentment before final payment. The method used to convey the check digit routine can vary. The check digit information can be transmitted to the drawee bank as part of the current Positive Pay file within which the check issuer provides the drawee bank with a list of checks issued against which the bank can match items such as the check number, account number and dollar amount when presented for payment. Alternatively or in addition thereto, the value of the check digit may be placed on the face of the check in the "aux on us" field in the MICR line or on the face of the check, via the check issuance system.

In accordance with the varying aspects of the present invention, a first computer system is used to manage the check printing and accounting process. This computer system includes additional software processes for generating a numerical coded value corresponding to, among other things, the individual name of the payee—a numeric value that is based on the transformation of the alpha characters of the payee.

The check issuer and the corresponding drawee bank will agree on a set or sets of numeric manipulations (hereinafter referred to as the "algorithm") to be employed for the specific customer's checks that will result in the check digit. This algorithm can vary by customer, by drawee account, by check serial range, or by check if needed. To protect against fraud, the algorithms are shared only by the check issuer and the drawee bank and only disclosed to other interested parties as agreed to by the check issuer and the bank.

A second computer system, located at the drawee bank, will have complementary software. This second system is also programmed to track and record disbursements associated with checks presented for payment by customer account. In addition, the system will recalculate the numeric value of the check digit using the agreed upon algorithm and compare it to the original check digit calculated when the check was issued. Any discrepancies will be reviewed by bank and check issuer personnel to determine the validity of the item(s) prior to final payment.

The foregoing features of the present invention are more fully and readily understood from the following detailed description of the presently preferred embodiments and presently preferred methods of practicing the invention.

BRIEF DESCRIPTION OF THE FIGURES

The invention will become more readily apparent from the following description of a specific illustrative embodiment thereof presented hereinbelow in conjunction with the accompanying drawings, of which.

DETAILED DESCRIPTION OF THE INVENTION

First briefly in overview, the present invention provides a computer programmed apparatus and process integrated into a fraud prevention system utilized by both sides of check processing transactions. The check issuance workflow begins the process, with a computer controlled accounting and printing system. This system generates a plurality of checks of varying amounts, bank accounts and payees. This is iteratively processed with the resulting checks physically generated via per se well-known high speed printers. The checks are then typically sorted and placed in individual envelopes for mailing to the designated individuals or corporate payees. The check amounts, payee and account data are tracked and the system databases are updated after a batch run.

For each payee, the system selectively assesses the payee's alpha-characters and using a pre-determined specialized algorithm, calculates a corresponding numeric rendition of the payee name either alone or in combination with other payee/check information, and ultimately, a corresponding check digit value. During the printing process, the check digit of this numeric rendition is applied to the check MICR Line or some other location on the check face prior to passing the check to the enveloping process, or it is captured and transmitted later as part of the check issuance file sent to the drawee bank.

The second aspect of the inventive system involves the check presentation processing. The system provides a second computer remote from the printing system and typically found at the drawee bank where checks will be presented. This computer hardware and software will track the receipt of the presented checks in conventional means, recording each presented check for posting against the check issuer's account(s).

The computer system will further include the enhancement of being able to use digital image technology or other ICR (Intelligent Character Recognition) to locate and interpret the printed payee and/or other relevant fields on the check including but not limited to the check serial number, dollar amount and issue date. The alpha characters in the payee name will be captured, "recognized" by the software, and converted to numerics according to a pre-defined algorithm. A check digit is calculated. This is then compared to the expected check digit received from the issuer or otherwise printed on the check. A match between the expected and calculated check digit confirms that the selected relevant fields such as the payee name, dollar amount, issue date and check number have not been altered.

Figure 1:
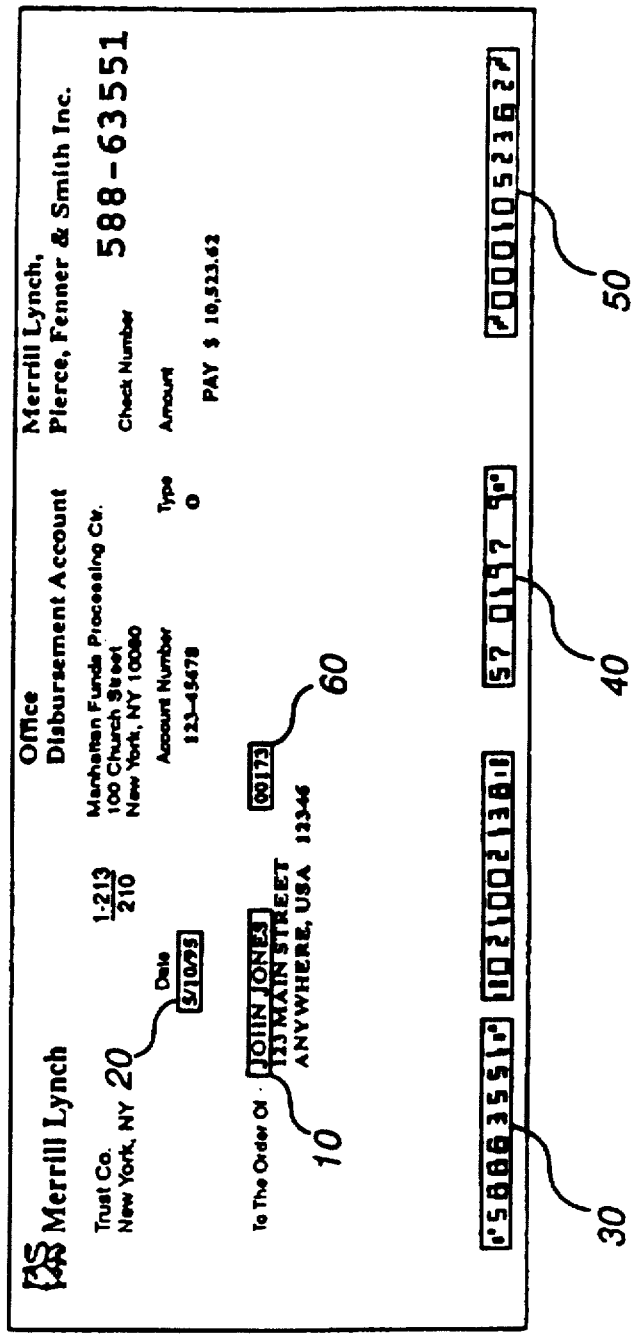
FIG. 1 depicts a typical check of the type used with the present invention.

With the foregoing background in mind, attention is first directed to FIG. 1, wherein a typical check is depicted having certain common characteristics important for understanding the instant invention. In particular, the check will have a payee designated 10, (in this example the payee's name is John Jones) which is typed in the central portion of the check and an issue date 20. The payee name and issue date are printed in a character font that is readable by the image scanner. The check includes other ancillary indicia, and several special purpose printed regions, including the MICR line comprised of the check number 30, the account number 40, and the amount of the check 50. To implement the present fraud detection system, the MICR line is augmented with a further numeric value—which may be encoded in the "Aux on us" field which is not shown. If the MICR line is not used, the check digit value may be placed on another check face location, pre-defined by the parties to the transaction, see for example item 60 in FIG. 1. Also, the algorithms are assigned identifying numbers—the number of the selected algorithm being placed on the check along with the check digit so that the drawee bank will know which algorithm to employ. As mentioned before, an alternative is to leave the check free of the check digit value and algorithm number, and electronically transmit the check digit to the drawee's bank in the paid issuance file. The coordination of algorithm selection may be by other means as found appropriate under the circumstances.

For example, to implement multiple algorithm use, authorized individuals of the check issuer and drawee bank agree on one or more algorithms that will be employed. A selected algorithm may use a selected combination of information (payee name, check number, account number, issue date and dollar amount) to calculate the check digit. Often, the algorithm uses the payee name and possibly other check and payee information in its calculations. In order to calculate the check digit, a first part of the algorithm involves converting all alpha characters of the check information to numerics. There are many possible ways to establish the alpha conversion of the payee value to a numeric code. One simple yet effective algorithm is delineated in Table 1 below herein each letter is sequentially assigned a corresponding numeric value.

TABLE I

| A | B | C | D | ... | X | Y | Z | SPACE |
|---|---|---|---|-----|----|----|----|-------|
| 0 | 1 | 2 | 3 | ... | 23 | 24 | 25 | 26    |

In accordance with this simple transformation, the payee name "John Jones" is converted to the digital value 9147132691413418; this large value is then utilized in a second part of the algorithm. The second part of the algorithm involves converting the numeric value of the selected check/payee information along with the numeric value of the payee name to a check digit. Specifically, in this example, the individual values are multiplied by a constant (e.g., "371"). This procedure is repeated for the selected check information including the check number, issue date and account number with the resulting string of products summed to provide a final, composite value:

| Payee:    | 9   | 1    | 4   | 7    | 1    | 3   |   |       |
|-----------|-----|------|-----|------|------|-----|---|-------|
|           | *3  | 7    | 1   | 3    | 7    | 1   |   |       |
|           | 27+ | 7+   | 4+  | 21+  | 7+   | 3   |   | ...+  |
| Check     | 5   | 8    | 8   | 6    | 3    | 5   |   | ...   |
| & Acct    | *3  | 7    | 1   | 3    | 7    | 1   |   | ...   |
| no.       | 15+ | 56+  | 8+  | 18+  | 21+  | 5+  |   | ...+  |
| Chk amt.  | 1   | 0    | 5   | 2    | 3    | 6   | 2 |       |
|           | *3  | 7    | 1   | 3    | 7    | 1   | 3 |       |
|           | 3+  | 0+   | 5+  | 6+   | 21+  | 6+  | 6 | +     |
| Issue     | 0   | 5    | 1   | 0    | 9    | 5   |   |       |
| date      | *3  | 7    | 1   | 3    | 7    | 1   |   |       |
|           | 0+  | 35+  | 1+  | 0+   | 63+  | 5   |   | = 517 |

The calculated value 517 is subtracted from the next largest whole number that ends with zero (520) resulting in the value "3" as the check digit. For additional complexity and security, a second check digit can be formed from the sum of the digits (5+2+0=7), thus resulting in the payee check digit "73", see item 60 of FIG. 1. In this example, the first three digits of item 60 "001" reflect the specific algorithm used to develop the check digit. In this way, one thousand (1,000) separate algorithms may be used in rotation.

The above calculations are illustrative of a transformation algorithm that combines the converted alpha characters from the payee name with the associated check number, issue date, account number and amount drawn to determine a positive identifying check digit value for imprinting onto the check face or transmission. The above algorithm is for illustrative purposes only, as it is contemplated that other numeric transformation techniques having greater complexity and security may be used.

Figure 2A:
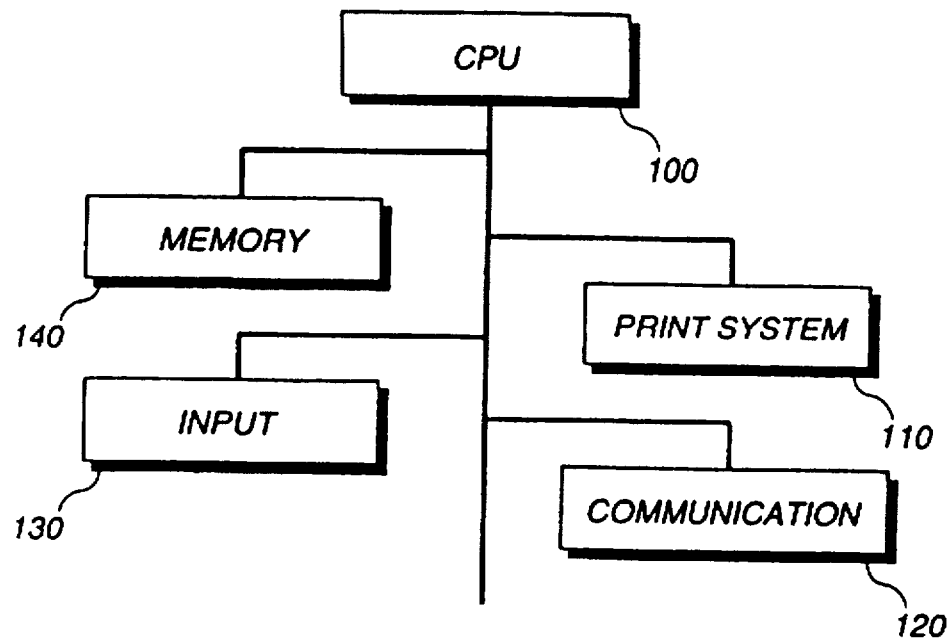
FIG. 2 depicts a functional block diagram of the key hardware components of the present invention.
Figure 2B:
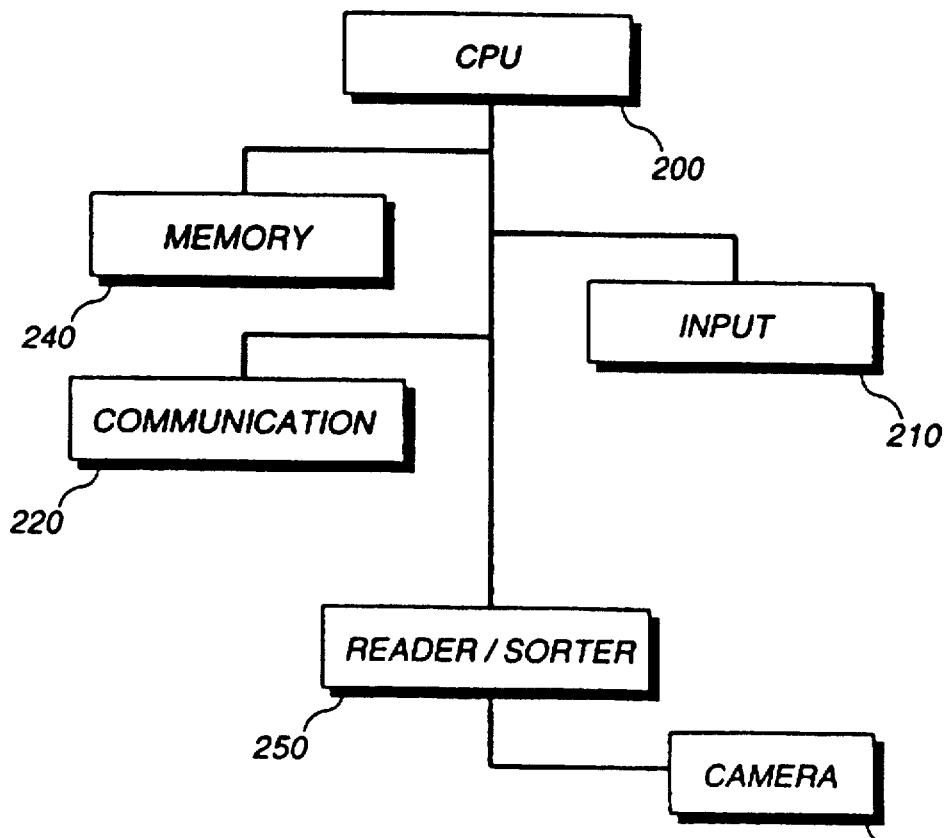

Turning now to FIGS. 2A and 2B, a block diagrams depict the associated hardware used to implement the above fraud detection system. As presented therein, the system is segregated into two CPUs representing the check issuance and drawee bank process, blocks 100 and 200, respectively. These are general purpose digital computers having the memory and processing power commensurate with the level of processing demand placed on the CPU by the institution.

Banks are traditionally heavy data processors and thus the CPUs are likely to be mainframe systems. With the advent of distributed processing, many aspects of mainframe processing are now done on a network of workstations and it is likely that such a network could also be used in conjunction with the present invention. Each computer system further comprises memory (blocks 140 and 240) for storage of the controlling programs and requisite data files, and communication ports (blocks 120 and 220) that permit transfer of data such as the electronic form of the paid issuance file (see below). A reader sorter, block 250, is used for reading and interpreting check MICR and other data, as well as for segregating checks in processing. The reader/sorter 250 further includes an image camera 260 for capturing the payee name and issue date from the face of the check when presented. These captured ALPHA and numeric characters are then converted to numeric values and combined with information read from the MICR line and the check digit routine is recalculated.

Both 130 and 210 have access to the same software to calculate and re-calculate the algorithmic check digit routines previously outlined in this document. The check issuance system further includes the printing system 110 for printing checks, and a communication subsystem for linking to other (possibly branch offices) locations for data transmission.

Figure 3:
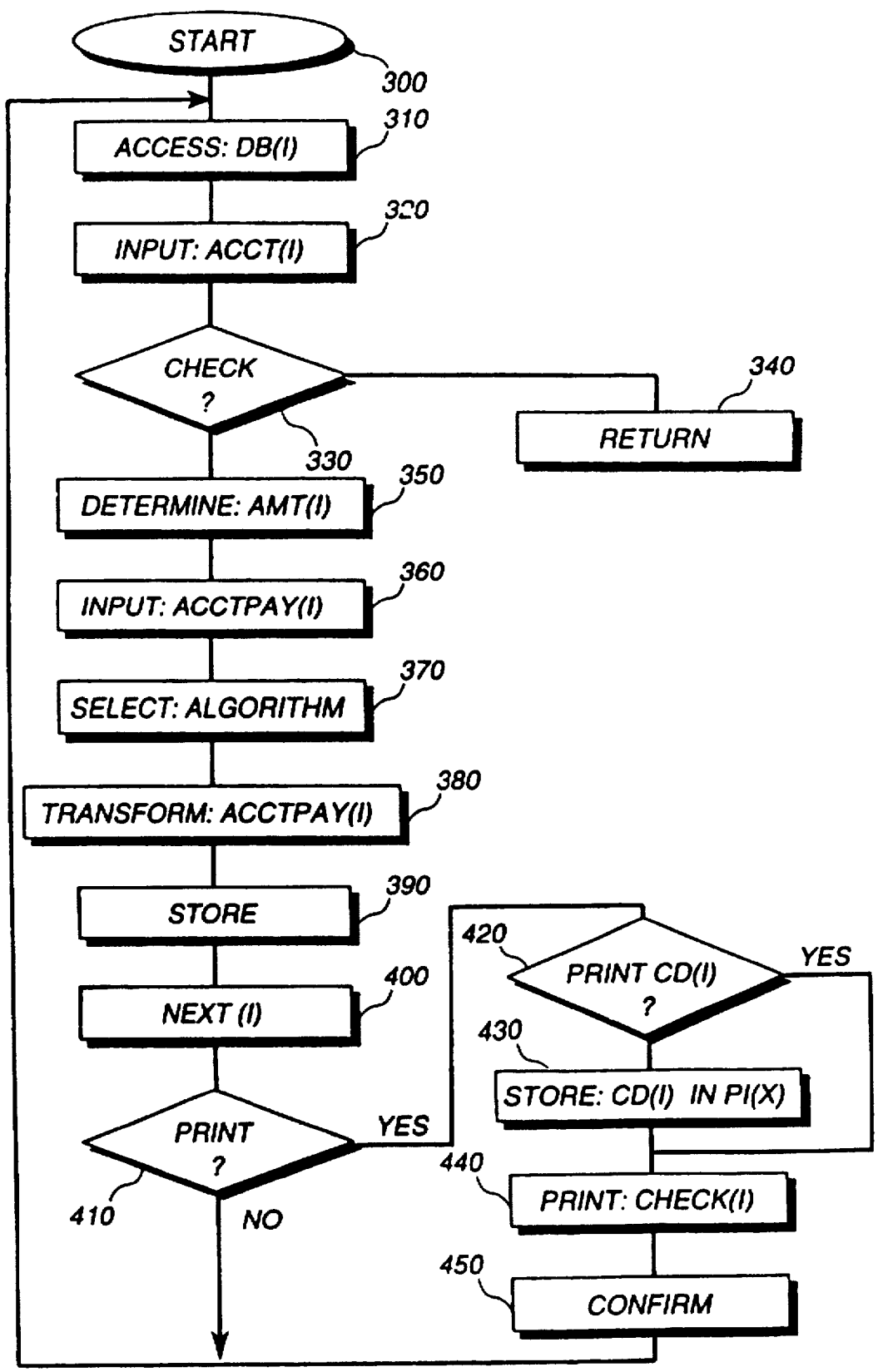
FIG. 3 depicts a logic flow chart for the computer management controlling logic for the present invention relating to the check issuance process.

Turning now to FIG. 3, the controlling logic as it relates to the check fraud prevention system is depicted in flow chart form. Starting at block 300, logic for the check creating process is initiated. At block 310, the database for check generation is accessed. This is typically a batch process for e.g., payroll or the like. The system utilizes tracking or index variables (I) to index between entries in the database DB (I). Accordingly, each account (I) is processed sequentially, block 320, to discern if a check is to be prepared, test 330—if negative, logic branches to block 340 and the system indexes to the next entry, I=I+1.

If a check is to be generated, "yes" to test 330, logic proceeds to block 350 wherein the amount is selected (or calculated). Alternatively, it can be assumed that a check will issue for each payee name. At block 360, the account number and payee name are pulled, and the check number and issue date selected. At block 370, the algorithm number is parsed from memory and the corresponding algorithm pulled for use. It is expected that many distinct algorithms will reside in memory and be available for use. At block 380, the account values (name, number, issue date and check amount) are transformed in accordance with the governing algorithm—resulting in the check digit value (described above) reflecting the payee name with the associated check number, amount, and account information. The calculated value is stored, block 390, with the algorithm number and the process is then iteratively indexed through the entire batch for that run, block 400. Thereafter, test 410 discerns whether this is a print run; if yes, logic proceeds to block 420 to determine if the check digit is to be printed. If no, logic proceeds to block 430 and the check digit is stored in the paid issuance file, PI(X). In either event, logic proceeds to check printing block 440, in which checks are printed with or without the check digit number as determined above, and block 450 for check print confirmation.

Figure 4:
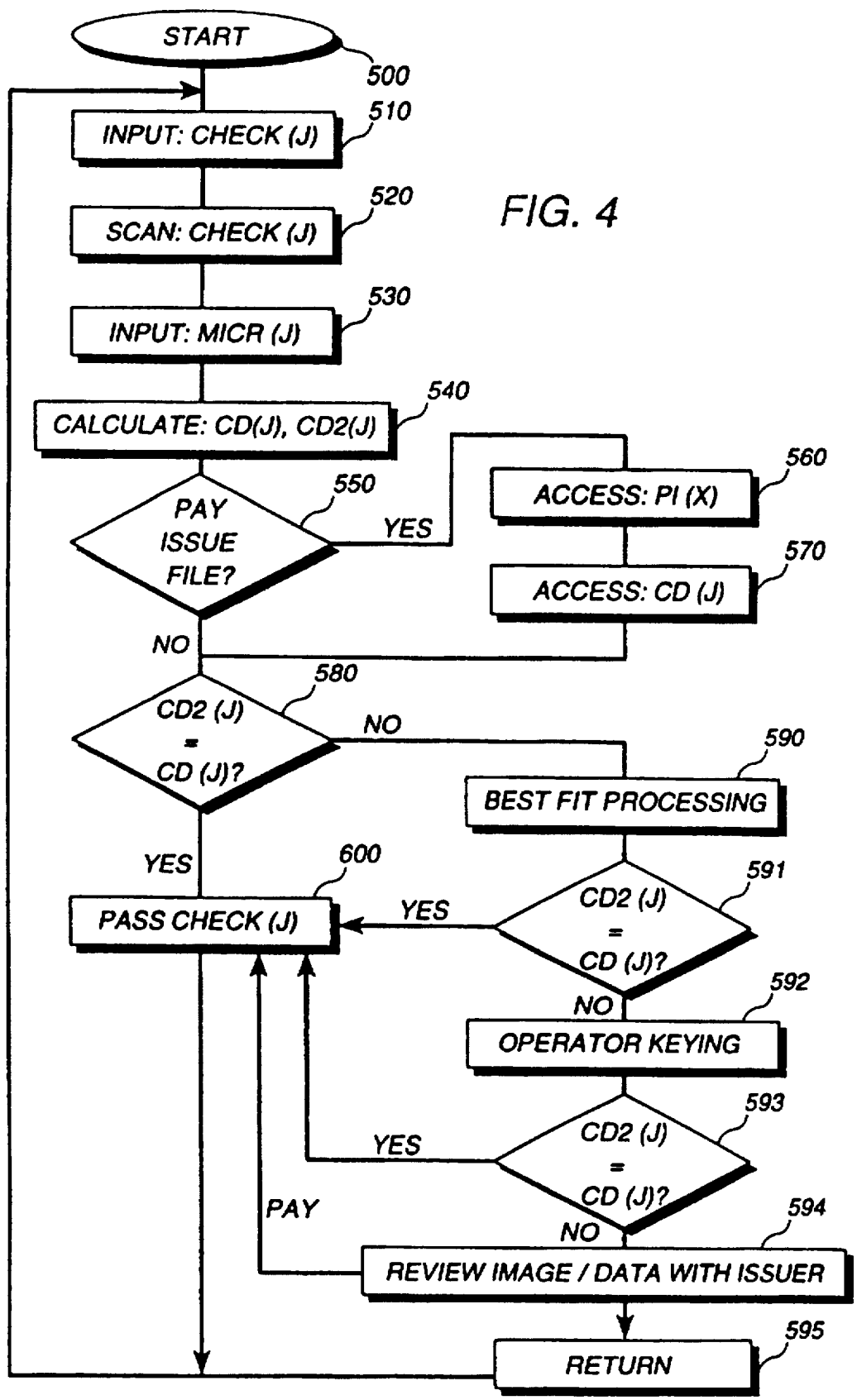
FIG. 4 depicts a logic flow chart for the computer management controlling logic for the present invention relating to the check review process by the drawee bank.

Turning now to FIG. 4, the logic underlying the check confirmation process is delineated. The process is initiated at start block 500, and continues to block 510 wherein the check presented for payment is input into the system and given an index (J) for tracking during processing. The presented check is then scanned, block 520, with the payee and other check date included in the captured image. If the algorithm number and check digit are included on the face of the check they are also captured. At block 520 and 530, the MICR data is inputted and stored at (J) index value location in the system. The system at block 540 interprets the payee name and other appropriate check data, including the algorithm number and check digit if printed on the face or MICR line of the check, then applies the appropriate algorithm to the captured MICR line and image to generate a check digit value CD (J). At test 550, if the algorithm number and/or check digit are not found on the check, the system queries as to the existence of a paid issuance file, previously transferred from the drawee bank. If yes to test 550, logic branches to block 560 and paid issuance file is pulled, PI(X). At block 570, CD2(J) is pulled from the paid issuance file, and logic proceeds to test 580. CD(J) is pulled from its location and the logic proceeds to test 580. At test 580, the system compares the CD(J) with the CD2(J) read from the check or the paid issuance file; if a match exists, processing continues to block 600 and check (J) is passed.

However, if a match is not made, the system logic is branched to special processing sequence, block 590. In block 590, the specialized software will attempt to "re-read" the check information fields as necessary and re-test the resulting values to determine if the revised check digit matches that provided by the check issuer. This process may be necessary since the software which reads and interprets these fields may arrive at more than one possible letter or number for each value in the field. The software will iteratively evaluate all field positions for which more than one possible value exists to determine if the changed value will result in CD2(J) being equal to CD(J).

If it is successful in finding a value that will make CD2(J)=CD(J), logic proceeds to 600. If not, the image of the check in question will be displayed to an operator, along with the interpreted values from the payee name, issue date, check number, and check amount fields. The operator will visually inspect the check image and the interpreted values to determine if the software made an error in its interpretation of one or more of the fields. If it has, the operator will key the correct values, over-writing the errors made by the software. Once keying is completed, the algorithm software will again be invoked to recalculate the check digit using the appropriate algorithm and the revised field values. If the revised check digit is found equal to that calculated by the check issuer, the item is paid in block 600. If CD2(J) does not equal CD(J) in block 593, the image is passed to a second operator in block 594 who will contact the issuer and determine if the item should be returned to the bank of first deposit in block 595.

It should be noted that all of the processing outlined above occurring at the drawee bank occurs within right of return guidelines as outlined in the Uniform Commercial Code. As used herein, payee information includes at least the payee name, and optionally, the account number, check number and check amount.

The foregoing logic has been illustrated as sequential; as is universally recognized, many other approaches for accomplishing the same result are available including continuous processing, menu indexing, etc.; the use of the above recitation was selected to demonstrate the inventive concepts in a straight forward and illustrative manner.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. In combination in a system for determining whether payee information on a check has been improperly modified after the original preparation of the check comprising:
    a first computer means for receiving and storing payee information for printing on a check;
    means for converting said printed payee information to an encrypted first digitized value for processing in a digital computer;
    a second computer means for receiving information about said check, including scanning means to convert a significant portion of the printed payee information that characterizes the printed payee information to a second digitized value; and
    said second computer means further comprising a comparison routine for determining whether the printed payee information on said check has been changed.

2. The system of claim 1 wherein said first digitized value is placed in the MICR code of the check and said second computer means reads said MICR coded first digitized value.

3. The system of claim 1 wherein said scanning means includes optical character recognition techniques for reading alpha characters.

4. The system of claim 3 wherein the first digitized value is generated by a local data processor based on a distinct and identified algorithm selected from a group of available algorithms.

5. The system of claim 4 wherein said first digitized value is a check digit corresponding to a payee name on said check.

6. The system of claim 1 wherein said characterizing portion is an entire payee field.

7. A banking fraud prevention process using a digital computer and utilized to prevent the submission for payment of checks having the designated payee information altered, comprising the steps of:
    transforming the payee information into a numerical value as an encoded payee identifier via a predetermined but not publicly known algorithm;
    receiving said payee identifier;
    receiving a presented check having a payee's information printed thereon;
    converting a significant portion of the printed payee information that characterizes the printed payee information of said presented check to digital value via said predetermined algorithm; and
    comparing said converted printed payee information with said coded value on said check to determine whether a match exists.

8. The process of claim 7 wherein the payee identifier is a check digit value based on the payee name, account number, check amount and check number.

9. The process of claim 8 wherein said algorithm is selected from a group of distinct algorithms.

10. The process of claim 9 wherein the printed payee name is converted to digital form by image capture software.

11. The process of claim 8 wherein the printed payee name on said presented check is scanned by an image camera.

12. The process of claim 7 further comprising the steps of incremental processing a series of pre-printed checks in a sequential manner.

13. In combination in a system for confirming check accuracy and preventing altered checks from being honored; said system comprising:

a. a first computer means for generating checks corresponding to accounts and payment obligations wherein each check has printed payee information;

b. means for calculating an encrypted numeric value corresponding to a significant portion of the printed payee information that characterizes payee information and for identifying a transformation algorithm used for encryption;

c. means for conveying said numeric value and the identified transformation algorithm to one or more drawee banks; and d. means for printing said checks for distribution to the payees.

14. The system of claim 13 wherein said means for conveying said numeric value to one or more drawee banks comprises placing said numeric value on said printed check.

15. The system of claim 13 wherein said means for conveying said numeric value to one or more drawee banks comprises placing said numeric value in a paid issuance file, 16. In combination in a data processing system for the detection of altered checks as presented at a drawee bank for disbursement, said system comprising:

a first computer means for printing a plurality of individual checks wherein said checks include payee information on the check face;

said first computer means further comprising data processing means for encrypting a significant portion of the printed payee information that characterizes all of said payee information to form a first digitized value; and a second computer means for processing checks submitted for payment, including means for receiving said first digitized value and scanning means for generating a second digitized value corresponding to said selected payee information;

said second computer means further comprising means for comparing said first and second digitized values to discern whether said values match.

17. The system of claim 16 wherein said data processing means further includes means for encrypting payee information in accordance with one of plural encryption algorithms wherein said selected algorithm is communicated to or calculated by said second computer means and used to transform said scanned payee information to said second digitized value.

18. The system of claim 17 wherein the selected encryption algorithm is communicated to said second computer means by placing an algorithm indicator on the face of said check.

19. The system of claim 18 wherein the selected encryption algorithm is sent to said second computer means by electronic file transfer.

20. The system of claim 19 wherein the encryption algorithm is part of a paid issuance file sent to the second computer means.

\* \* \* \* \*